Nov. 29, 1938.　　　W. F. ECKERT　　　2,138,148
GEAR SHIFT
Filed Jan. 2, 1937　　　3 Sheets-Sheet 1

INVENTOR
William F. Eckert
BY
ATTORNEY

Nov. 29, 1938.   W. F. ECKERT   2,138,148
GEAR SHIFT
Filed Jan. 2, 1937   3 Sheets-Sheet 2
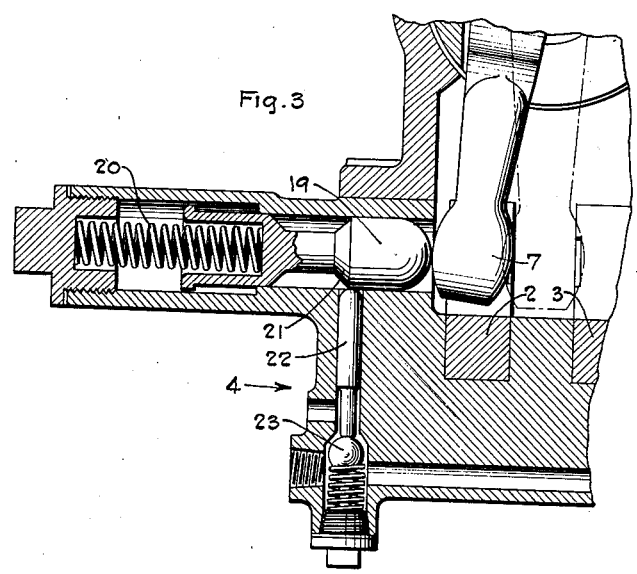
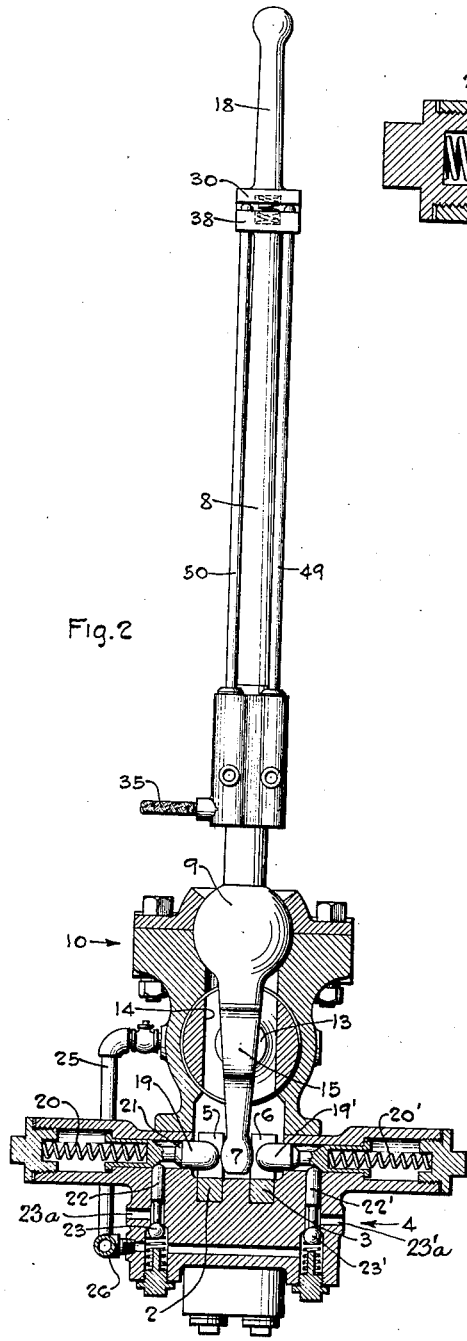
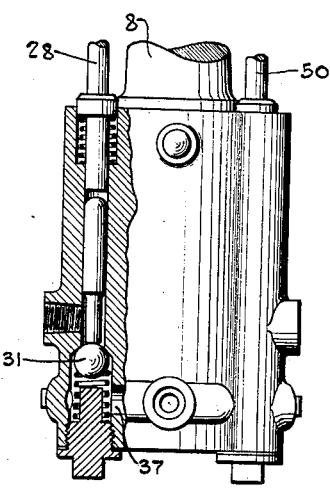
INVENTOR
William F. Eckert
BY
Edward Hathaway
ATTORNEY Nov. 29, 1938.　　　　W. F. ECKER　　　　2,138,148
GEAR SHIFT
Filed Jan. 2, 1937　　　　3 Sheets-Sheet 3

Air Supply

INVENTOR
William F. Eckert
BY
ATTORNEY

Patented Nov. 29, 1938

2,138,148

UNITED STATES PATENT OFFICE 2,138,148

GEAR SHIFT

William F. Eckert, Ridley Park, Pa.

Application January 2, 1937, Serial No. 118,709

11 Claims. (Cl. 74—335)

This invention relates generally to apparatus for selecting and shifting speed change gears of a gear transmission and more particularly to improved means for controlling and effecting power shifting of the gears.

The present invention is particularly applicable to speed change gear transmissions for internal combustion engine locomotives wherein relatively large horsepower is transmitted through heavy gears to the locomotive driving wheels. Due to the inherently large size of the parts required to transmit the necessary power to the driving wheels as well as to withstand the sudden stresses imposed upon the parts created by starting a train of freight cars from standstill in a commonly known manner, it will be readily understood that in order to have the transmission occupy minimum space every effort must be made to have the transmission and its accessories arranged compactly but without sacrificing the rugged character of such apparatus. While various types of power operated gear shifting mechanisms have been proposed and used, yet they have many deficiencies such as excessive cost in manufacture and installation, as well as requiring an excessive amount of space.

It is an object of my invention to provide an improved power operated gear shift mechanism and selective control therefor that are relatively simple and economical in construction, operation and maintenance while at the same time being extraordinarily compact and rugged.

A further object is to provide an improved construction and arrangement of parts for expediting the control of power to the servo-motor without imposing burdensome operating technique or thought on the part of the operator.

A further object is to provide an improved combination whereby many of the parts may perform multiple functions, thus permitting such parts to be manufactured and tested as complete sub-units ready for assembly with the complete selector and power unit.

Other objects and advantages will be more apparent to those skilled in the art from the following description of the accompanying drawings in which:

Fig. 2 is a transverse section taken substantially on the line 2—2 of Fig. 1 but showing the gear shift lever and power controlling valve casing in elevation;

Fig. 3 is an enlarged fragmentary transverse sectional view similar to the lower portion of Fig. 2 but showing the gear lever in position to initiate shifting of a gear and showing the manner in which an air exhaust valve is first opened by initial lateral movement of the lever;

Fig. 4 is an enlarged elevational view of the power control valve casing with part thereof broken away to show details of construction of one valve.

Figure 1:
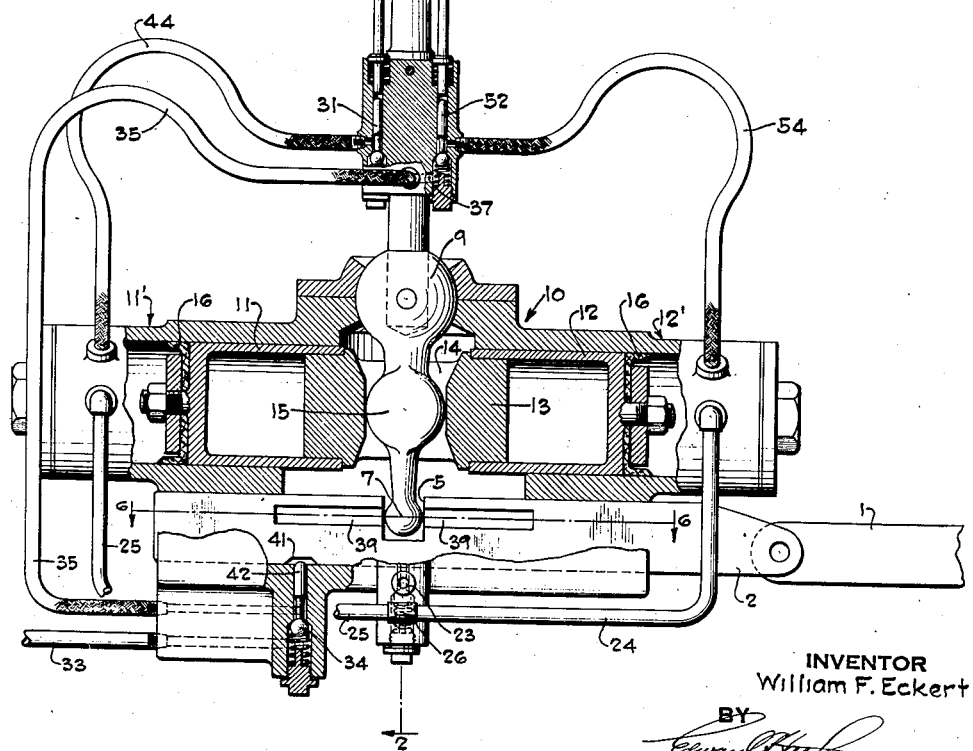
Fig. 1 is a side elevation of my improved control and power operated gear shifting unit, parts of which are broken away to show details of construction.

In the particular embodiment of the invention which is disclosed herein merely for the purpose of illustrating one specific form among possible others that the invention might take in practice, there is not shown any transmission as it will of course be readily understood that my improved gear shift control is applicable to any one of various conventional types of gear transmissions which embody one or more longitudinally movable gear shifting rods. One such rod is diagrammatically indicated herein at 1, Fig. 1, pivotally or otherwise connected respectively to a gear selector bar 2, Figs. 1 and 2, while a similar rod would be connected to a selector bar 3. These selector bars or elements are longitudinally slidably guided by being disposed in suitable grooves or recesses formed in a casing generally indicated at 4. These bars are provided with notches 5 and 6 to receive the lower free ball end 7 of a gear shift lever 8 which is swivelly supported by a ball and socket joint 9 in the top of a servo-motor casing generally indicated at 10. The selector bars 2 and 3 are also transversely spaced apart as shown in Fig. 2 whereby the ball end 7 will overlap both selector bars as shown in Fig. 2 when the gear shift is in neutral.

Servo-motor pistons 11 and 12 are connected together as a single unit through an intermediate member 13, Fig. 1, having a vertical passageway 14 through which the gear shift lever extends. A cylindrical portion 15 is formed on the dependent portion of the lever so as to have sliding contact with the opposed walls of passageway 14 and said passageway as shown in Fig. 2 is of sufficient transverse width that cylindrical portion 15 may freely move in accordance with any selected position of the gear shift lever while still maintaining its operative relation to the servo-motor. It will of course be understood that the pistons of the servo-motor may be of any suitable type but are herein shown as having the usual form of cup packing 16.

*Control structure and operation.*—The remaining structure and the operation of the device as a whole will be more readily apparent by describing the sequence of operation thereof. As described above, the gear shift is adapted for four positions, that is, when ball 7 is in recess 5, the selector bar 2 may be shifted forwardly or backwardly. Similarly when ball 7 is in recess 6, selector bar 3 has forward or backward positions. Assuming that it is desired to shift selector bar 2 rearwardly (to the right in Fig. 1), the operator grasps a gear shift handle 18 and moves lever 8 laterally (to the right with respect to Fig. 2). This will cause ball 7 to move into the recess 5 and simultaneously engage a plunger type cam follower 19 so as to force the same outwardly against a spring 20 until its inclined cam surface 21 engages and pushes down an exhaust valve plunger 22, thereby opening a spring check valve 23. Thereupon both servo-motor cylinders 11' and 12' will be exhausted to atmosphere by reason of their said ends being commonly connected together by pipes 24 and 25 which communicate with the check valve recess through a common T 26 and thence to an atmospheric exhaust port 23a, Fig. 2. The operator will now move handle 18 forwardly (to the left, Fig. 1) but due to said handle being pivoted as at 27 to lever 8 the initial action is for handle 18 to pivot relative to lever 8 which momentarily remains stationary. During this relative pivoting action, two valve rods 28 and 29 will be moved downwardly by suitable lateral lugs or ears 30 formed integrally with handle 18. These rods will thereupon open a selective air supply valve 31 and an exhaust valve 32. However, air supply from any suitable source connected through a pipe 33, Fig. 1, is prevented by a spring pressed check valve 34 from entering a common supply pipe 35, which is connected to valve 31 by a passage 37, Fig. 5. After the valves 31 and 32 are open (the air supply being shut off by check valve 34), the operator continues to move handle 18 forwardly which now carries with it lever 8 by virtue of lugs 30 engaging stop lugs 38 on lever 8. Inasmuch as each of the servo-motor cylinders 11' and 12' is vented to the atmosphere through ball check valve 23 and exhaust port 23a, Fig. 2, it is seen that selector bar 2 may be manually moved. However, after a slight extent of movement of the lever sufficient for cam follower 19 to ride off of ball 7, said follower will thereupon move into a longitudinal groove 39 formed in the outer side of selector bar 2, thereby closing off the common exhaust valve 23. Simultaneously with the initial movement of selector bar 2, a cam 41 formed as in a recess, Fig. 1, will engage a follower plunger 42 to open the main supply control valve 34. Thereupon air pressure is admitted from pipe 33 to pipe 35 and passage 37, thence through the open check valve 31 and a pipe 44 to the servo-motor cylinder 11' to move the piston 11 to the right by power and accordingly cause cylindrical portion 15 to effect power movement of the selector bar through ball 7. Fluid pressure supplied to cylinder 11' is prevented from flowing through pipes 25 and 24 to the other cylinder 12' by reason of a check valve 24', Fig. 5. The cylinder 12' is exhausted during this plunger movement through a pipe 45 which is connected to exhaust valve 32. When the gear has been fully shifted, the operator removes his hand from handle 18, thereby restoring check valves 31 and 32 to their closed position.

The valves above described comprise manually selectable means for controlling the power operation of said servo-motor. The handle 18 and associated elements for operating the valves and for selecting the gear shift comprise common means for effecting these functions.

From the foregoing description, it is seen that the gear shift lever and selector bar must be in complete cooperative relation and able to effect actual manual shifting of the selector bar before power is actually applied to the servo-motor. Hence there is no danger that any of the parts will be momentarily in an inoperative relation at the time power is applied and in addition the above mode of operation gives the operator some sense of "feel" in the actual gear selecting and shifting.

Figure 5:
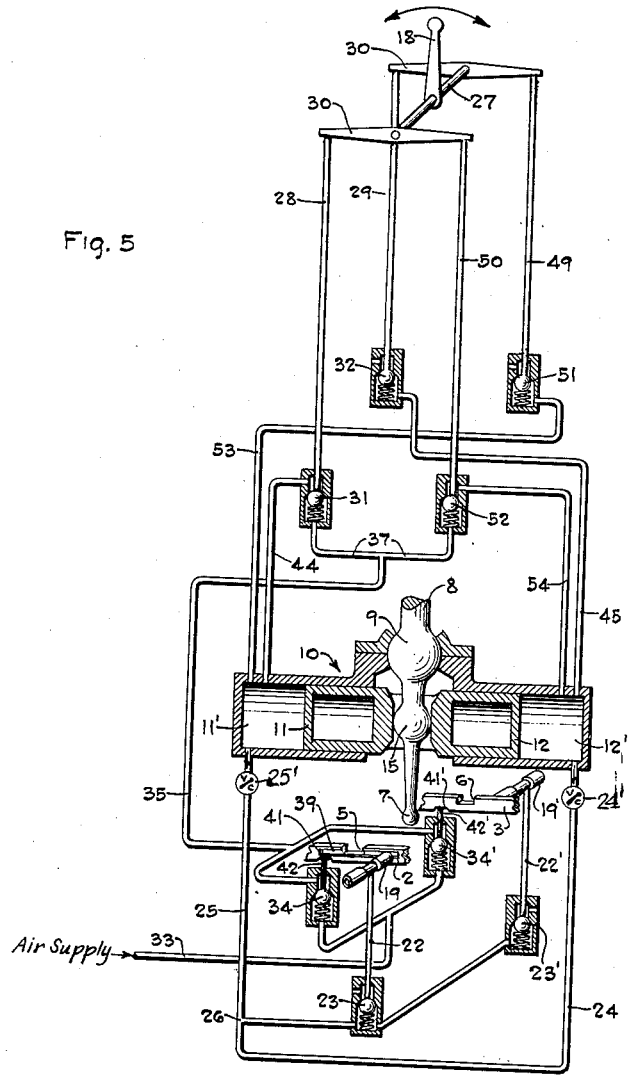
Fig. 5 is a diagrammatic perspective of the mechanism for selectively operating the valves for controlling flow of power to the servo-motor, together with the servo-motor and certain other associated parts shown diagrammatically in section.
Figure 6:
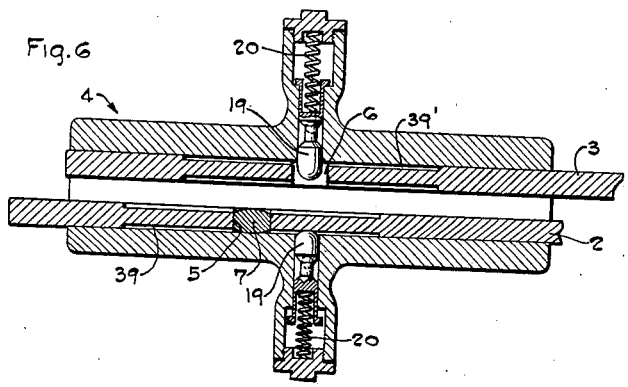
Fig. 6 is a horizontal fragmentary sectional view taken substantially on the line 6—6 of Fig. 1 but showing the gear shift lever in engagement with the selector bar and sufficiently longitudinally displaced from its neutral position so as to effect control of one of the exhaust valves.

To return the selector bar to its neutral position from its right hand shifted position as above described, the operator moves handle 18 to the right, Fig. 1, whereby initial relative pivotal movement of the handle with respect to lever 8 causes a set of valve rods 49 and 50 to open an exhaust valve 51 and an air admission valve 52, Fig. 5. Cylinder 11' is thereupon vented to the atmosphere through a pipe 53 and valve 51 while air is supplied through pipes 35 and passage 37, valve 52 and pipe 54 to the cylinder 12'. Fluid pressure supplied to cylinder 12' is prevented from flowing into the cylinder 11' by reason of check valve 25', Fig. 5. Thus the servo-motor pistons 11 and 12 will be moved to the left to carry therewith cylindrical portion 15 and ball 7 so as to return selector bar 2 to its neutral position. When the neutral position is reached, the operator merely moves handle 18 so as to close valves 51 and 52. Simultaneously follower plunger 19, Fig. 2, and plunger 42, Fig. 1, will return respectively to the recess 5 and cam recess 41. The apparatus is thereupon in condition to select any other gear position and effect power shifting thereto. The other positions are obtained by following the identical cycle of operation as above described, and hence it is not believed necessary to repeat the above description and substance except to point out that in moving selector bar 2 to the left (Fig. 1) from its neutral position, handle 18 is laterally moved so as to cause the lower free end 7 of lever 8 to engage notch 5 of selector bar 2 and is then moved rearwardly (to the right) to open valves 51 and 52, whereupon continued movement of handle 18 to the right causes valve 23 to close by reason of follower plunger 19 falling into the right hand portion of recess 39. Also, plunger 42 (Figs. 1 and 5) will now be depressed by cam 41 so as to open the main air supply valve 34.

Also, the operation of selector bar 3 is accompanied by the identical sequence of operations as heretofore described for bar 2 except lever 8 is laterally moved to the left (Fig. 2) to initiate forward or backward movement of the selector bar. Corresponding elements associated with selector bars 2 an 3 are therefore given the same reference number except that the reference numbers of the parts associated with bar 3 are primed.

From the foregoing disclosure it is seen that I have provided a relatively simple, compact and efficient manually selectable and controlled power operated gear shifting means that is so constructed and arranged as to insure the parts to be in their full cooperative relation before power is applied thereto and to provide the operator with a sufficient "feel" of the gear shifting operation so as to avoid any harmful effects during gear shifting. It is apparent that even though the operator attempted to shift gears while the clutch was still engaged, enough sliding resistance would exist between the gears so as to prevent the operator from initially moving a selector bar in order to release the follower plunger 19, Fig. 2, close exhaust valve 23 and open the main air supply 34. The selector bars would only be able to move if operating conditions are substantially normal, and to this extent the operator would have an initial feel of the existence of such conditions.

It will of course be understood that changes in details of construction and arrangement of parts may be made by those skilled in the art without departing from the spirit of the invention as set forth in the appended claims.

I claim:

1. A gear selector and shifting mechanism comprising, in combination, a fluid operated servo-motor, gear shift selector elements adapted to be operated by said servo-motor, manually selectable valves for controlling supply of operating fluid to said servo-motor, a lever adapted to be manually shifted to selective gear shift positions, and means whereby said lever must initially move a gear in a direction for shifting the same before power is supplied to said servo-motor including means moved by said servo-motor for supplementing the control of fluid supply thereto.

2. A gear selector and shifting mechanism comprising, in combination, a fluid operated servo-motor, gear shift selector elements adapted to be operated by said servo-motor, a gear shift lever directly connected to said servo-motor so that the motor and lever move together, manually selectable valves for controlling supply of fluid pressure to and exhaust of fluid from said servo-motor, said valves being supported on said lever for movement therewith, means supported by said lever and movable relative thereto for operating said valves and moving said lever to a selected gear shift position, and means whereby fluid power is supplied to said servo-motor after said selected gear shift position is effected.

3. A gear selector and shifting mechanism comprising, in combination, a double acting fluid servo-motor, gear shift selector elements adapted to be operated by said servo-motor, a gear shift lever connected to said servo-motor, a plurality of manually selectable valves for controlling supply of power to and exhaust of power from one or the other ends of said double acting servo-motor, means whereby said control valves are supported by said lever so as to be bodily movable therewith, and a handle supported by said lever for movement relative thereto to select operation of said valves in accordance with the desired direction of servo-motor operation.

4. A gear selector and shifting mechanism comprising, in combination, a double acting fluid servo-motor, gear shift selector elements adapted to be operated by said servo-motor, a gear shift lever connected to said servo-motor, a plurality of manually selectable valves for controlling supply of power to and exhaust of power from one or the other ends of said double acting servo-motor, means whereby said control valves are supported by said lever so as to be bodily movable therewith, a handle supported by said lever for movement relative thereto to select operation of said valves in accordance with the desired direction of servo-motor operation, and means for exhausting both ends of said servo-motor including a valve controlled by said lever when initially moved to a gear shifting position and adapted to close said exhaust upon initial movement of said lever in a gear shifting direction.

5. A gear selector and shifting mechanism comprising, in combination, a double acting fluid servo-motor, gear shift selector elements adapted to be operated by said servo-motor, a gear shift lever connected to said servo-motor, a plurality of manually selectable valves for controlling supply of power to and exhaust of power from one or the other ends of said double acting servo-motor, means whereby said control valves are supported by said lever so as to be bodily movable therewith, a handle supported by said lever for movement relative thereto to select operation of said valves in accordance with the desired direction of servo-motor operation, means for exhausting both ends of said servo-motor including a valve controlled by said lever when initially moved to a gear shifting position and adapted to close said exhaust upon initial movement of said lever in a gear shifting direction, a main air supply valve for controlling the supply of air to said manually selectable control valves, and means for opening said main air valve only after initial movement of said lever in a gear shifting direction.

6. A gear selector and shifting mechanism comprising, in combination, a double acting servo-motor, a pair of selector bars, a gear shift lever adapted to be laterally moved when in a neutral position so as to selectively engage one or the other of said bars, means whereby said servo-motor is operatively connected to whichever bar is selected but not connected to the other unselected bar, means for controlling the supply and exhaust of fluid to said servo-motor to effect forward or reverse movement of the selected bar thereby to shift gears in accordance with movement of said bar, and means whereby the selected bar effects a supplemental control of the fluid supply to the servo-motor and must be initially manually moved before operating fluid may be supplied to said servo-motor.

7. A gear selector and shifting mechanism comprising, in combination, a double acting servo-motor, a gear shift lever pivotally and laterally slidably connected to said servo-motor, a pair of selector bars having recesses to receive the free end of said lever upon lateral movement thereof, and inlet and exhaust valves for one end of said servo-motor and inlet and exhaust valves for the other end of said motor, means for commonly supporting all of said valves on said lever for bodily movement therewith, a handle supported on said lever for pivotal movement in only one plane with respect to the lever, means for operating the inlet and exhaust valves for one end of said servo-motor by movement of said handle in one direction relative to said lever and vice versa for operating the valves for the other end of the servo-motor, whereby said handle may be moved transversely bodily with said lever to select one of said selector bars and effect an operative relation therewith and thereafter said handle may be bodily moved to effect operation of said valves so as to admit fluid pressure to said servo-motor.

8. The combination set forth in claim 7 further characterized by the provision of means whereby the selected bar must be initially moved in a gear shifting direction before fluid pressure is supplied by said servo-motor to continue the gear shifting operation.

9. The combination set forth in claim 7 further characterized by the provision of valve mechanism for exhausting both ends of said servo-motor, means whereby said gear shift lever is operative upon lateral movement to open said exhaust valve mechanism and simultaneously select one or the other of said selector bars, and means whereby said exhaust valve is closed after initial movement of said lever in a gear shifting direction.

10. The combination set forth in claim 7 further characterized by the provision of main air supply valve mechanism, means for opening said latter valve mechanism only after initial movement of the selected bar whereupon fluid power is supplied to said servo-motor to continue the gear shifting operation.

11. A gear selector and shifting mechanism comprising, in combination, a double acting servo-motor having a piston with a vertical passage therein, a swivelly supported gear shift lever having a depending tongue extending through said piston opening for pivotal, and laterally slidable, connection with the walls of said opening, a plurality of selector bars having recesses adapted to selectively receive the lower free end of said tongue, longitudinal grooves formed in the outer faces of said bars, valve means operative to exhaust both ends of said servo-motor, a pair of opposed plungers normally receivable in the recesses of said selector bars to prevent longitudinal movement thereof and adapted to control said exhaust valve means, one or the other of said plungers being laterally moved out of the selector bar recess by said gear shift lever tongue when the same is laterally moved, thereby opening said exhaust valve, and means whereby said valve thereafter is adapted to be closed and power supplied to said motor to effect a gear shifting operation.

WILLIAM F. ECKERT.